(12) United States Patent
Kim et al.

(10) Patent No.: US 11,181,035 B1
(45) Date of Patent: Nov. 23, 2021

(54) EXHAUST HEAT RECOVERY SYSTEM FOR A VEHICLE USING A MAGNETIC VALVE ACTUATOR

(71) Applicants: HYUNDAI MOTOR COMPANY, Seoul (KR); KIA CORPORATION, Seoul (KR)

(72) Inventors: Min-Jae Kim, Hwaseong-si (KR); Seung-Tae Kong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/319,913

(22) Filed: May 13, 2021

(30) Foreign Application Priority Data

Nov. 2, 2020 (KR) .................. 10-2020-0144238

(51) Int. Cl.
*F01P 7/14* (2006.01)
*F01N 5/02* (2006.01)
*F01P 3/20* (2006.01)
*F16K 31/122* (2006.01)
*F16K 27/12* (2006.01)
*F28D 21/00* (2006.01)

(52) U.S. Cl.
CPC ................ *F01P 7/14* (2013.01); *F01N 5/02* (2013.01); *F01P 3/20* (2013.01); *F16K 27/12* (2013.01); *F16K 31/122* (2013.01); *F28D 21/0003* (2013.01); *F01P 2007/146* (2013.01); *F01P 2060/00* (2013.01)

(58) Field of Classification Search
CPC .......... F01P 7/14; F01P 3/20; F01P 2007/146; F01P 2060/00; F16K 27/12; F16K 31/122; F28D 21/0003; F01N 3/0234; F01N 5/02; F01N 2240/02
See application file for complete search history.

(56) References Cited

U.S. PATENT DOCUMENTS

| 8,973,537 | B2 | 3/2015 | Lee et al. |
| 2014/0182522 | A1 | 7/2014 | Lee et al. |
| 2019/0128169 | A1* | 5/2019 | Han ................ F01N 13/1805 |

FOREIGN PATENT DOCUMENTS

| KR | 101371492 B1 | 3/2014 |
| KR | 20190136268 A | 12/2019 |

* cited by examiner

*Primary Examiner* — Jacob M Amick
(74) *Attorney, Agent, or Firm* — Lempia Summerfield Katz LLC

(57) ABSTRACT

An exhaust heat recovery system applied to an engine system includes a magnetic valve actuator that uses a resistive force against magnetic forces of magnetic elements to decrease a forward movement speed of a push rod made by a wax expansion force of wax that exchanges heat with a coolant passing through an internal space or to decrease a restoring movement speed of the push rod made by a wax contraction force of the wax, or that uses an additional force of the magnetic forces to increase the forward movement speed of the push rod or the restoring movement speed of the push rod.

20 Claims, 9 Drawing Sheets

FIG.7
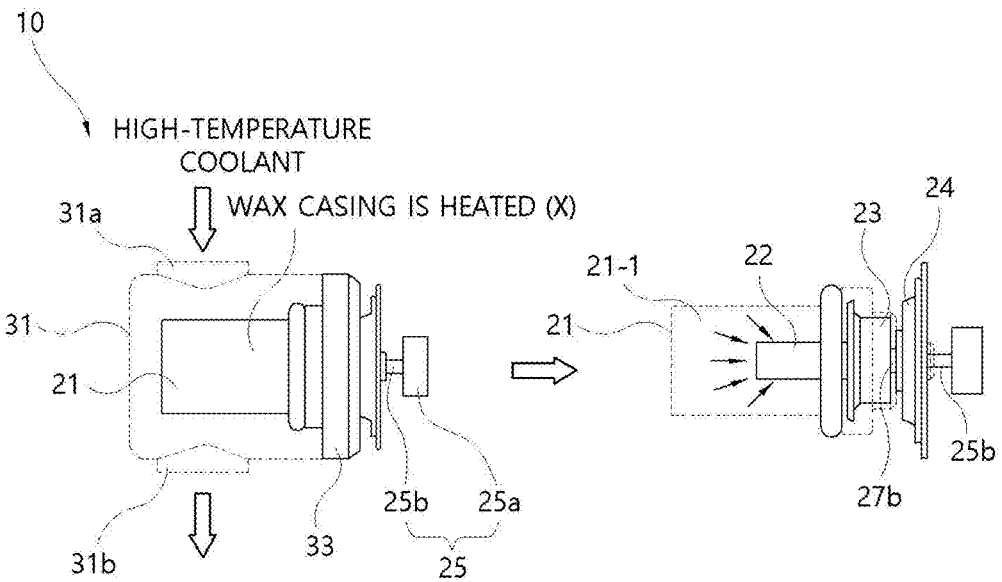
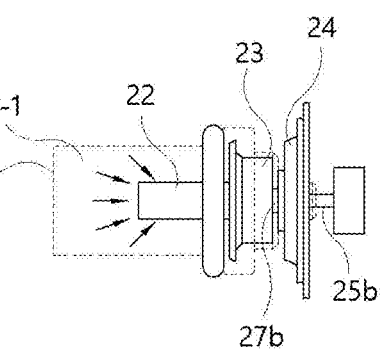
(a) WAX IS EXPANDED BY INTRODUCTION OF COOLANT
(b) PUSH ROD IS PUSHED OUT BY EXPANSION OF WAX
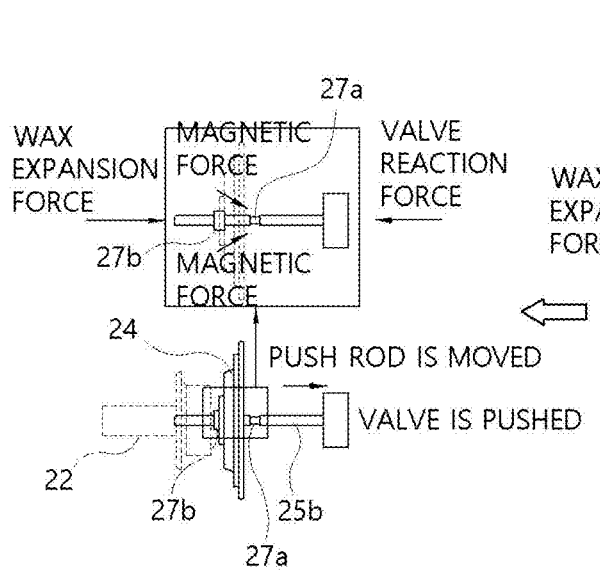
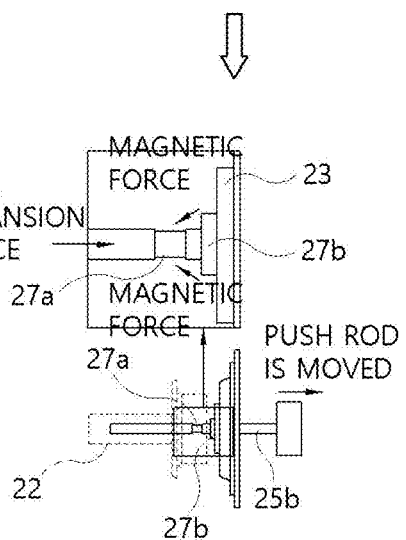
(d) MAGNETIC FORCE AND WAX FORCE ARE APPLIED IN SAME DIRECTION
(c) MAGNETIC FORCE AND WAX FORCE ARE APPLIED IN OPPOSITE DIRECTIONS ion No. 10-2020-0144238, filed on Nov. 2, 2020, which
EXHAUST HEAT RECOVERY SYSTEM FOR A VEHICLE USING A MAGNETIC VALVE ACTUATOR

CROSS-REFERENCE TO RELATED APPLICATION

This application claims priority to Korean Patent Application No. 10-2020-0144238, filed on Nov. 2, 2020, which is incorporated herein by reference in its entirety.

BACKGROUND OF THE DISCLOSURE

Field of the Disclosure

The present disclosure relates to a valve actuator, and particularly, to an exhaust heat recovery system for a vehicle, using a magnetic valve actuator which is structurally compact and implements an operation of opening or closing a valve using restoring force without a spring by combining magnetic force with wax expansion/contraction force that depends on a temperature.

Description of Related Art

In general, in a vehicle, a valve actuator is applied to a fluid flow line to control an intake air flow rate, a fuel supply flow rate, an engine coolant flow rate, an exhaust gas flow rate, or the like. The valve actuator controls a fluid flow by performing an operation of opening or closing a valve.

Examples of the valve actuator include a thermostat. The thermostat uses a mechanical wax actuator as a driving part, and the thermostat is expanded or contracted depending on an engine coolant temperature, such that a flow path is controlled by a stroke movement caused by the expansion or the contraction.

To this end, the mechanical wax actuator includes two wax/spring covers, two wax/spring cover caps, a wax assembly, a push rod, a push rod head, a return spring, a retainer, and a bushing.

Therefore, the mechanical wax actuator implements the operation of opening or closing the valve by converting wax expansion force of the wax assembly into movement force of the push rod while reducing a side effect using a spring and other components.

And the mechanical wax actuator is widely applied as a valve driving part for controlling a fluid flow in a fluid flow line to control an intake air flow rate, a fuel supply flow rate, an engine coolant flow rate, an exhaust gas flow rate, or the like.

However, because the mechanical wax actuator requires ten or more components including the wax assembly, the push rod, the spring, and other components, the mechanical wax actuator has the following disadvantages.

For example, first, the about ten components of the mechanical wax actuator inevitably perform functions redundant among the components. Second, a shape of the actuator increases due to the number of components performing redundant functions, and thus makes it difficult to mount the actuator in the vehicle in a compact system layout of the vehicle. Third, the large number of components inevitably complicates manufacturing and assembling processes.

SUMMARY OF THE DISCLOSURE

An object of the present disclosure considering the above point is to provide an exhaust heat recovery system for a vehicle using a magnetic valve actuator, which is applied as a magnetic wax actuator using restoring force without a spring and a balance between magnetic forces in the actuator and expansion force or contraction force of wax that depends on a temperature, thereby operating a valve without using elastic force of the spring. In particular, an object of the present disclosure considering the above point is to provide an exhaust heat recovery system for a vehicle using a magnetic valve actuator in which magnetic force adjusts a movement speed of a push rod made by expansion force or contraction force of wax, thereby implementing miniaturization with a structure simplified by eliminating components related to a reduction in side effect, and simplifying manufacturing and assembling processes by reducing the number of components.

In one aspect, the present disclosure provides a valve actuator including: a valve cover unit having an internal space filled with a coolant; and a wax valve unit configured to form a forward movement stroke in which a push rod comes out of the valve cover unit and a restoring movement stroke in which the push rod enters the valve cover unit. The wax valve unit is further configured to generate a wax expansion force for the forward movement stroke and a wax contraction force for the restoring movement stroke by allowing wax to exchange heat with the coolant in the internal space. The wax valve unit is further configured to generate, on a movement route of the push rod through magnetic elements, magnetic forces from a resistive force and an additional force against the wax expansion force and the wax contraction force.

As an embodiment, the magnetic force may use the resistive force to decrease a movement speed of the push rod made by the wax expansion force or the wax contraction force or use the additional force to increase the movement speed of the push rod.

As an embodiment, the wax valve unit may include: a wax valve housing positioned in a left internal space of the internal space which is filled with the coolant; a wax casing filled with the wax and coupled to the wax valve housing; a guide coupled to the wax casing and positioned in a right internal space of the internal space which is not filled with the coolant; a valve cap coupled to the guide; a rod bar attachment magnet provided on the push rod and configured to constitute one of the magnetic elements; and a guide attachment magnet provided on the guide and configured to constitute another of the magnetic elements, generate the resistive force in a state in which the guide attachment magnet approaches the rod bar attachment magnet, and generate the additional force in a state in which the guide attachment magnet is spaced apart from the rod bar attachment magnet.

As an embodiment, the wax valve housing, the wax casing, the guide, the valve cap, and the push rod may be arranged in a straight line.

As an embodiment, the push rod may include: a rod bar having one end positioned in the wax casing and the other end which comes out of the valve cap in a state in which one end of the rod bar is in contact with the wax; and a piston formed integrally with the other end of the rod bar.

As an embodiment, the rod bar may have a stepped portion to which the rod bar attachment magnet is coupled. In an embodiment, the rod bar may have the stepped portion formed at a position at which the rod bar attachment magnet is spaced apart from the guide attachment magnet in the state in which one end of the rod bar is in contact with the wax.

As an embodiment, the guide may have a guide boss protruding from a center of a guide body and penetrating the valve cap, the guide attachment magnet may be provided on the guide boss, and the guide attachment magnet may be positioned on an inner diameter portion of the guide boss.

As an embodiment, the wax valve unit may include sealing members configured to seal the left internal space and the right internal space.

As an embodiment, the sealing members may be configured as a packing and an O-ring, the packing may be coupled to the valve cap to seal the right internal space, and the O-ring may be coupled to the wax valve housing to seal the left internal space.

As an embodiment, the valve cover unit may include: a coolant housing cover having the internal space having an inlet portion into which the wax valve unit is inserted, and having a coolant inlet port through which the coolant is introduced, and a coolant outlet port through which the coolant is discharged; a cover cap coupled to the inlet portion of the coolant housing cover and configured to seal the internal space; and an elastic ring positioned inside the cover cap and configured to seal the coolant housing cover and the cover cap.

As an embodiment, the coolant housing cover may have a valve support inner wall formed in the internal space and configured to support the wax valve unit. The valve support inner wall may divide the internal space into a left internal space which is filled with the coolant and a right internal space which is not filled with the coolant.

As an embodiment, the coolant housing cover and the cover cap may be coupled by means of fixing members. The fixing members may couple the coolant housing cover and the cover cap through engagement implemented by an engagement structure having protruding and depressed portions (凸, 凹).

As an embodiment, the engagement structure may include: the protruding portions (凸) formed on the coolant housing cover; and the depressed portions (凹) formed in the cover cap. The protruding portions (凸) and the depressed portions (凹) may engage with one another as the cover cap rotates in a state in which positions of the protruding portions (凸) and the depressed portions (凹) coincide with one another.

In another aspect, the present disclosure provides an exhaust heat recovery system for a vehicle. The exhaust heat recovery system includes a valve actuator configured to use a resistive force against magnetic forces of magnetic elements to decrease a forward movement speed of a push rod made by a wax expansion force of wax that exchanges heat with a coolant passing through an internal space or to decrease a restoring movement speed of the push rod made by a wax contraction force of the wax, or configured to use an additional force of the magnetic forces to increase the forward movement speed of the push rod or the restoring movement speed of the push rod. The system further includes a heat exchanger configured to exchange heat between the coolant and exhaust gas and an exhaust gas flow control unit provided in an exhaust pipe in which the exhaust gas flows and configured to apply a valve reaction force to a restoring movement stroke after a valve is operated by a forward movement stroke of the push rod.

As an embodiment, the magnetic elements may include: a rod bar attachment magnet configured to move together with the push rod; and a guide attachment magnet fixed into the valve actuator in which the magnetic force is generated as the resistive force while the rod bar attachment magnet approaches the guide attachment magnet in a movement route of the push rod and in which the magnetic force is generated as the additional force while the rod bar attachment magnet moves away from the guide attachment magnet.

As an embodiment, the valve actuator may be mounted on the exhaust gas flow control unit by means of a mounting bracket.

As an embodiment, the valve actuator may introduce the coolant into a coolant supply pipe connected to a cooling system of an engine system and discharge the coolant into a coolant return pipe to return the coolant back to the cooling system.

The magnetic valve actuator applied to the exhaust heat recovery system for a vehicle according to the present disclosure implements the following operations and effects.

First, it is possible to implement the magnetic wax actuator, which is different from the mechanical wax actuator, by implementing the operation of opening or closing the valve using a balance between the wax expansion force and the magnetic force. Second, the magnetic wax actuator may use a balance between the wax expansion force and the magnetic force to reduce the side effect and generate restoring force without a spring, and as a result, it is possible to implement a compact size in comparison with the mechanical wax actuator by eliminating the relevant components. Third, the compact magnetic wax actuator simplifies the internal structure, and simplifies manufacturing and assembling processes by reducing the number of components. Fourth, the operation of opening or closing the valve is performed by the compact magnetic wax actuator, such that a stable operation is implemented without a rapid change in stroke movement caused by the temperature of the coolant. Fifth, the magnetic wax actuator and the wax cover valve are attached or detached with the engagement structure including the protruding and depressed portions (凸, 凹), such that it is not necessary to perform a process of forming threads after a shaping process, unlike the screw thread fastening structure of the mechanical wax actuator. Sixth, the magnetic wax actuator is used for the flow control valve of the exhaust heat recovery system for a vehicle, such that there is no drawback of the mechanical wax actuator in which rattling noise such as "rumbling" occurs when the vehicle travels at the moment when the contact is implemented due to a rapid change in movement amount of the push rod with respect to a change in temperature of the engine coolant.

BRIEF DESCRIPTION OF THE DRAWINGS

FIG. 7 is a view illustrating an operating state in which the magnetic valve actuator is thermally expanded by a high-temperature coolant heated by the exhaust heat recovery system according to the present disclosure.

DESCRIPTION OF SPECIFIC EMBODIMENTS

Hereinafter, embodiments of the present disclosure are described in detail with reference to the accompanying drawings. For example, the embodiments may be implemented in various different forms by those having ordinary skill in the art to which the present disclosure pertains, and the present disclosure is not limited to the described embodiments. When a component, device, element, or the like of the present disclosure is described as having a purpose or performing an operation, function, or the like, the component, device, or element should be considered herein as being "configured to" meet that purpose or to perform that operation or function.

Figure 1:
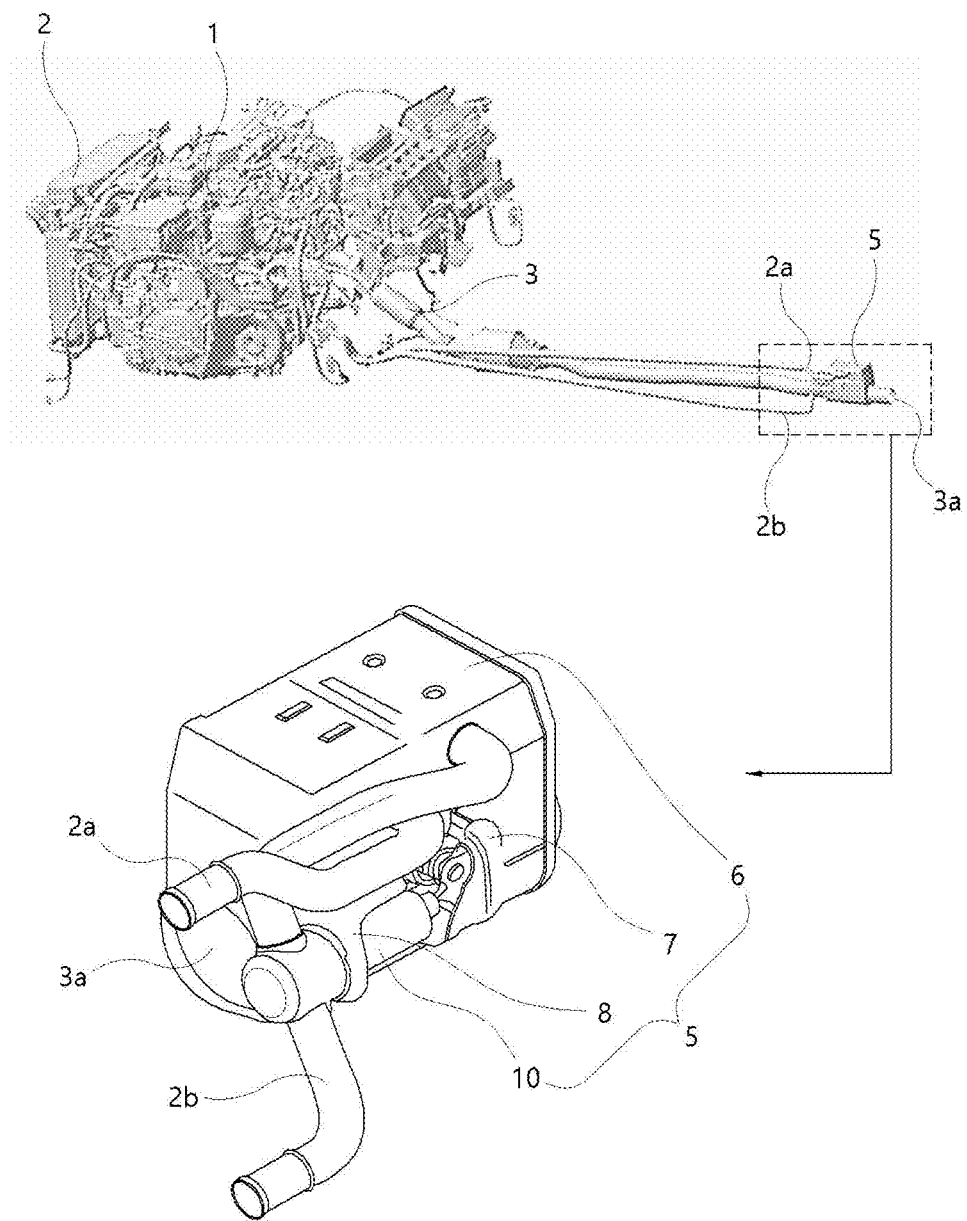
FIG. 1 is a configuration view of a magnetic valve actuator to be applied to an exhaust heat recovery system for a vehicle according to the present disclosure.
Figure 2:
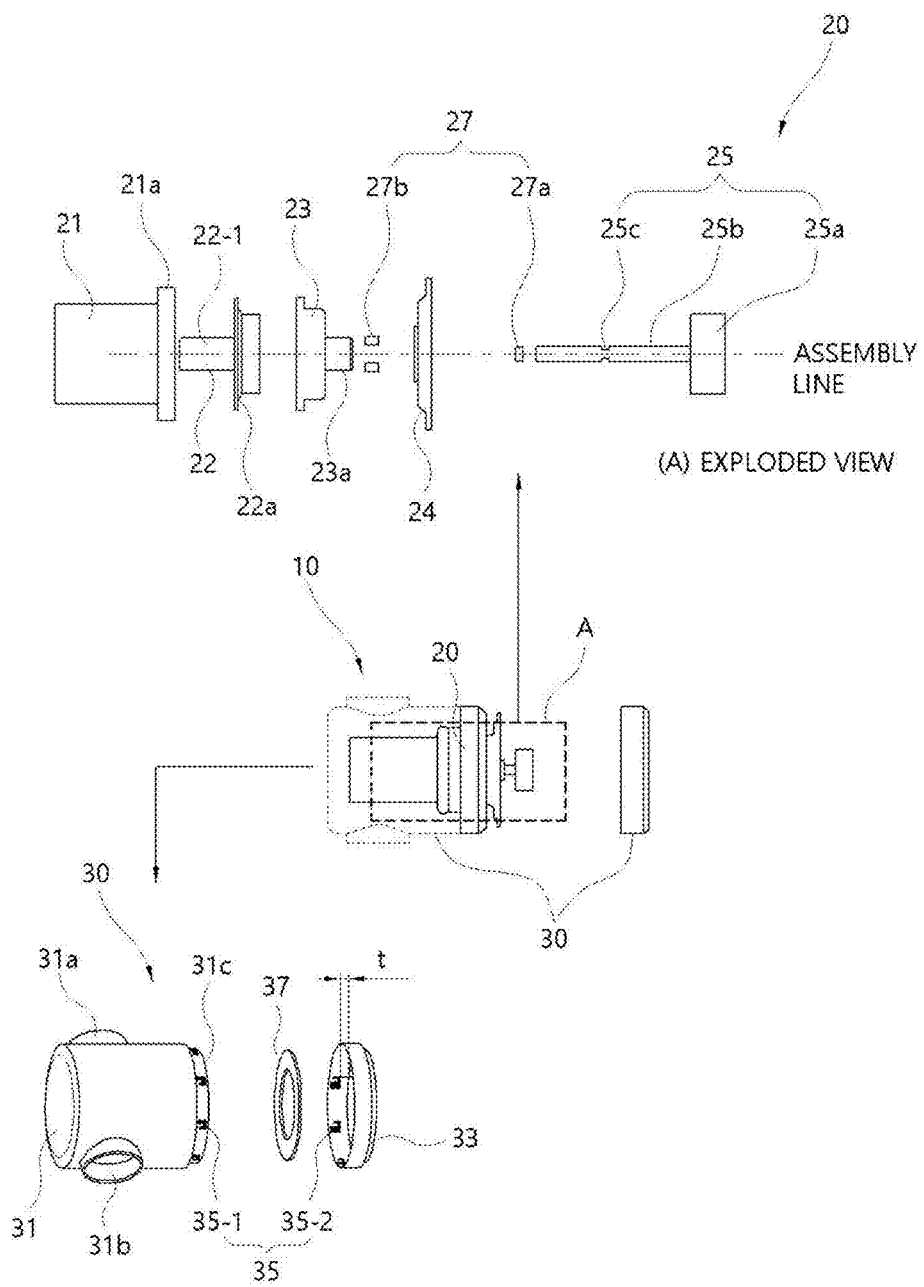
FIG. 2 is a detailed configuration view of a wax valve unit and a valve cover unit that constitute the magnetic valve actuator according to the present disclosure.

Referring to FIG. 1, an engine system 1 includes an exhaust heat recovery system 5 using a valve actuator 10 including a wax valve unit 20 (see also FIG. 2) and a valve cover unit 30 (see also FIG. 2).

For example, a cooling system 2 is a water-cooled cooling system that controls a temperature of an engine by circulating a coolant. An exhaust system 3 removes harmful gas from exhaust gas produced by combustion in the engine and then discharged, and the exhaust system 3 discharges, to the atmosphere, the exhaust gas with lowered negative pressure. Therefore, the cooling system 2 and the exhaust system 3 are identical to a general cooling/exhaust system that constitutes an internal combustion engine system.

For example, the exhaust heat recovery system 5 includes a heat exchanger 6, an exhaust gas flow control unit 7, and a valve actuator 10. The exhaust heat recovery system 5 is connected to the cooling system 2 and the exhaust system 3 and raises a temperature of an engine coolant in the cooling system 2 with exhaust gas that flows along an exhaust pipe 3a of the exhaust system 3 from the heat exchanger 6 by an operation of the exhaust gas flow control unit 7 controlled by the valve actuator 10.

Therefore, the exhaust heat recovery system 5 raises a temperature of the coolant with the exhaust gas before the exhaust gas is discharged to the atmosphere. Thereby, the system 5 reduces the time required to warm up the engine, utilizes the high-temperature exhaust gas to be discharged to the atmosphere, and thus meets environmental regulations tightened in respect to the exhaust gas.

However, in the exhaust heat recovery system 5, the valve actuator 10 is embedded with wax 22-1 and magnetic elements 27 (see FIG. 2). The valve actuator 10 uses a balance between a wax expansion/contraction force and a resistive/additional force of a magnetic force in a state in which the valve actuator 10 is mounted in a housing of the exhaust gas flow control unit 7 (or a housing of the heat exchanger 6) by means of a mounting bracket 8. The valve actuator 10 uses the balanced force to control the exhaust gas flow control unit 7 mounted in the exhaust pipe 3a of the exhaust system 3 based on a movement stroke of a push rod (see FIG. 2), thereby changing a low-temperature coolant, which is supplied from a coolant supply pipe 2a of the cooling system 2, to a high-temperature coolant, and returning the high-temperature coolant to the cooling system 2 through a coolant return pipe 2b.

In particular, the valve actuator 10 does not require spring restoring force because the valve actuator 10 receives valve reaction force by the exhaust gas flow control unit 7 in a restoring movement stroke after the valve of the exhaust gas flow control unit 7 is operated by a forward movement stroke among the movement strokes of the push rod (see FIG. 2).

Meanwhile, FIGS. 2 to 6 illustrate detailed constituent elements of the valve actuator 10.

Referring to FIG. 2, the valve actuator 10 includes the wax valve unit 20 and the valve cover unit 30. In particular, the wax valve unit 20 includes, as characteristic constituent elements, the wax 22-1 for generating the wax expansion force depending on the temperature, and the magnetic elements 27 for generating the magnetic force. The valve cover unit 30 includes, as a characteristic constituent element, fixing members 35 having engagement structures having protruding and depressed portions (凸, 凹).

Therefore, the wax valve unit 20 generates the restoring force without a spring, with the balance between the wax expansion force and the magnetic force with respect to the motion of the push rod 25. In particular, the magnetic elements 27 include a rod bar attachment magnet 27a and guide attachment magnets 27b which are disposed at different positions, spaced apart from each other at a predetermined distance, and are not in contact with each other, such that the intensity of the magnetic force varies depending on the position of the push rod 25. In addition, the valve cover unit 30 has the fixing members 35 having an attaching/detaching fitting structure and including protruding portions (凸) 35-1 and depressed portions (凹) 35-2 which are fastened or separated without a screw thread. In particular, the shape and the fastening structure applied to the attaching/detaching fitting structure may generate the restoring force without being loosened after the assembly, thereby supporting the entire wax valve unit 20.

Figure 3:
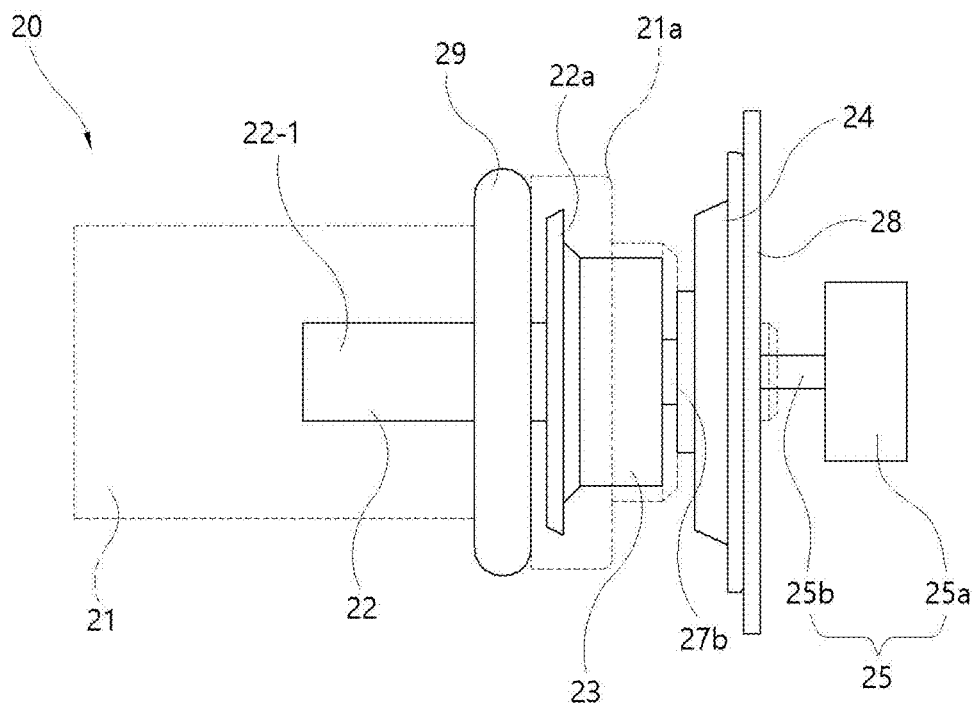
FIG. 3 is a view illustrating a state in which the wax valve unit according to the present disclosure is assembled.

Referring to FIGS. 2 and 3, the wax valve unit 20 includes a wax valve housing 21, a wax casing 22, a guide 23, a valve cap 24, the push rod 25, and the magnetic elements 27. In this case, the wax valve housing 21, the wax casing 22, the guide 23, the valve cap 24, the push rod 25, and the magnetic elements 27 are assembled in a straight axial line with respect to the push rod 25.

For example, the wax valve housing 21 is provided as a "U"-shaped cylindrical housing body having an inlet portion into which the wax casing 22 is inserted, and the wax valve housing 21 protects the wax casing 22. A casing flange 21a having a relatively large diameter is concentrically formed at a side of the inlet portion of the housing body, such that a stepped section is formed at a portion, connected to the housing body, by the casing flange 21a.

For example, the wax casing 22 is filled with the wax 22-1 while forming an inlet portion into which a rod bar 25b of the push rod 25 is inserted, and the wax casing 22 is formed as a cylindrical wax casing body to be received in the housing body of the wax valve housing 21. A sealing flange 22a having a relatively large diameter is concentrically formed at a side of the inlet portion of the wax casing body. In addition, the guide 23 includes a guide body that receives and surrounds the sealing flange 22a of the wax casing 22. A guide boss 23a having a relatively small diameter is concentrically formed at one side of the guide body, and the rod bar 25b of the push rod 25 is fitted with the guide boss 23a.

The valve cap 24 is provided as a circular plate body, and the circular plate body is in close contact with the guide body of the guide 23 in the state in which the circular plate body is fitted with the guide boss 23a of the guide 23.

In particular, the sealing flange 22a of the wax casing 22 blocks and seals the inlet portion of the housing body of the wax valve housing 21. An elastic piece or a rubber piece may be further provided at a lateral side of the sealing flange 22a so as to be in close contact with an inner surface of the inlet portion of the housing body of the wax valve housing 21. The guide attachment magnets 27b of the magnetic elements 27 are provided on an inner diameter portion of the guide boss 23a of the guide 23. An outer diameter of the circular plate body of the valve cap 24 is larger than a diameter of the casing flange 21a of the wax valve housing 21, such that the circular plate body of the valve cap 24 may be in close contact with an inner diameter portion of a cover casing 31 constituting the valve cover unit 30 (see FIG. 6).

For example, the push rod 25 includes a piston 25a and the rod bar 25b. The rod bar 25b is inserted into the wax casing 22 by passing through the valve cap 24 and the guide 23 and comes into contact with the wax 22-1 that fills the wax casing 22. The piston 25a having a relatively large diameter is concentrically provided at one side of the rod bar 25b, thereby defining a predetermined thickness.

In particular, a stepped portion 25c is formed in the rod bar 25b of the push rod 25. The stepped portion 25c has a relatively small diameter formed by reducing a diameter of the rod bar 25b, and the rod bar attachment magnet 27a of the magnetic elements 27 is fixedly seated in the stepped portion 25c.

For example, the magnetic elements 27 include the rod bar attachment magnet 27a and the guide attachment magnets 27b. The magnetic force of the rod bar attachment magnet 27a and the magnetic forces of the guide attachment magnets 27b define repulsive forces with respect to one another.

To this end, the rod bar attachment magnet 27a is coupled to the stepped portion 25c of the rod bar 25b of the push rod 25 and moves together with the push rod 25, and the guide attachment magnets 27b are coupled to the inner diameter portion of the guide boss 23a of the guide 23 and fixed together with the guide 23.

The wax valve unit 20 includes sealing members 28 and 29, and the sealing members 28 and 29 are configured as a packing 28 and an O-ring 29. In this case, the packing 28 and the O-ring 29 are made of rubber and elastically deformed to be in close contact with the opposite components, thereby improving sealing performance.

For example, the packing 28 is fitted with the outer diameter portion of the circular plate body of the valve cap 24, and the O-ring 29 is made of rubber and positioned in the stepped section formed between the cylindrical housing body of the wax valve housing 21 and the casing flange 21a.

Figure 4:
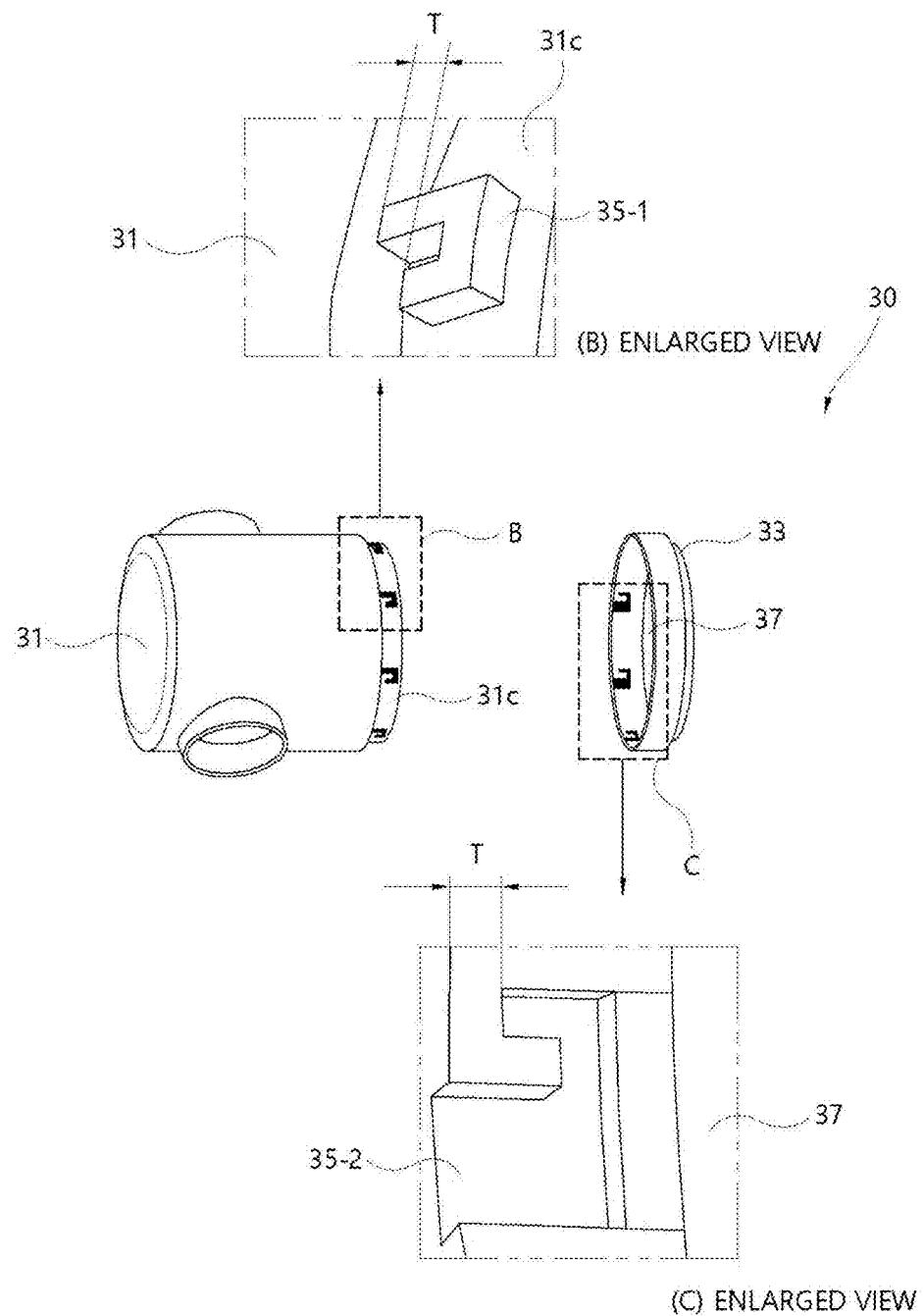
FIG. 4 is a view illustrating an example of a fitting assembling structure applied to the valve cover unit according to the present disclosure.

Referring to FIGS. 2 and 4, the valve cover unit 30 includes a coolant housing cover 31, a cover cap 33, the fixing members 35, and an elastic ring 37.

For example, the coolant housing cover 31 is provided as a cylindrical cover housing body having an inlet portion into which the wax valve unit 20 is inserted, such that the assembly of the wax valve housing 21, the wax casing 22, the guide 23, and the valve cap 24 is received in the coolant housing cover 31. The cover cap 33 is coupled to a side of the inlet portion of the cover housing body.

In particular, the coolant housing cover 31 is provided with a coolant inlet port 31a, a coolant outlet port 31b, a cap end 31c, and a valve support inner wall 31d.

For example, the coolant inlet port 31a and the coolant outlet port 31b protrude from the cover housing body of the coolant housing cover 31. The coolant inlet port 31a is connected to the coolant supply pipe 2a (see FIG. 1) of the cooling system 2, whereas the coolant outlet port 31b is connected to the coolant return pipe 2b (see FIG. 1) of the cooling system 2.

The cap end 31c having a relatively small diameter is concentrically provided at the side of the inlet portion of the cover housing body of the coolant housing cover 31, and the cover cap 33 is coupled to the cap end 31c. Further, the valve support inner wall 31d divides an internal space of the cover housing body of the coolant housing cover 31 into a left internal space and a right internal space.

For example, the cover cap 33 has a hole (see FIG. 6) formed at a center thereof so that the piston 25a of the push rod 25 is positioned outside, and the cover cap 33 is coupled to the cap end 31c of the coolant housing cover 31 through a cover cap rim.

In particular, the elastic ring 37 is positioned in a space in the cover cap rim of the cover cap 33.

For example, the fixing members 35 include the protruding portions (凸) 35-1 formed at predetermined intervals along the outer diameter of the cap end 31c of the coolant housing cover 31, and the depressed portions (凹) 35-2 formed at predetermined intervals along the inner diameter of the cover cap rim of the cover cap 33.

In particular, the protruding portion (凸) 35-1 has a protruding structure, whereas the depressed portion (凹) 35-2 has a groove structure, and the protruding structure and the groove structure are integrated into a single shape by being fitted with each other in a "弖" shape. In this case, the "弖" shape defines a fitting gap T with one side removed so that the protruding portion (凸) 35-1 and the depressed portion (凹) 35-2 are easily fitted with each other.

For example, the elastic ring 37 is positioned in the space in the cover cap rim of the cover cap 33 and disposed at a seating interval t from the depressed portions (凹) 35-2 of the fixing members 35. The elastic ring 37 is in close contact with the lateral side of the cap end 31c of the cover casing 31 by the elastic deformation in rubber, thereby improving sealing performance.

Figure 5:
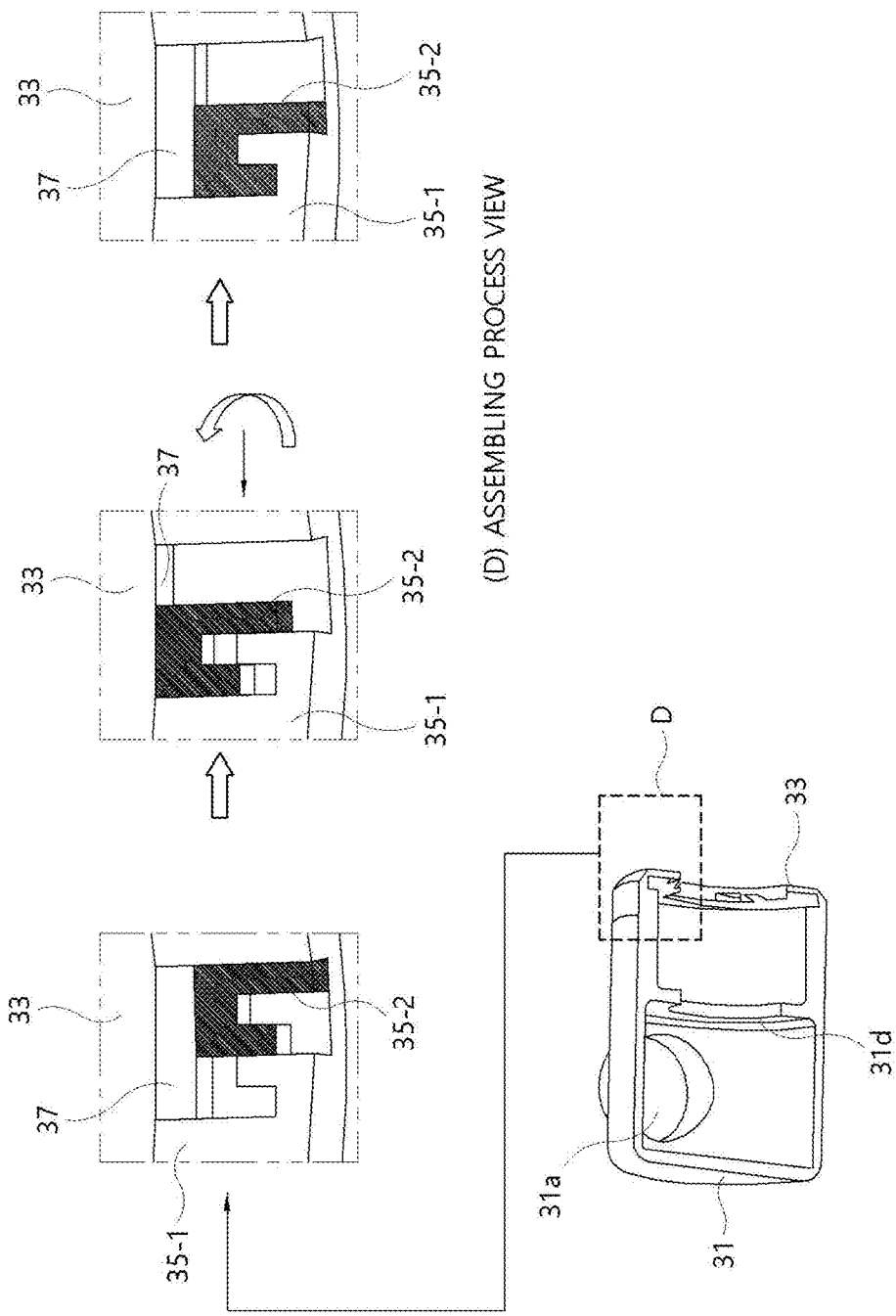
FIG. 5 is a view illustrating a state in which the valve cover unit according to the present disclosure is assembled.

FIG. 5 illustrates the assembling process of fastening the coolant housing cover 31 and the cover cap 33 when the fixing members 35 have the non-screw-thread fastening structure, i.e., the engagement structure including the protruding and depressed portions (凸, 凹).

First, when the cover cap 33 is positioned on the cap end 31c of the coolant housing cover 31 through the cover cap rim, the protruding portions (凸) 35-1 and the depressed portions (凹) 35-2 of the fixing members 35 are in close contact with one another.

When the cover cap 33 is pushed as the position of the cover cap 33 is adjusted, the depressed portions (凹) 35-2 of the cover cap 33 and the protruding portions (凸) 35-1 of the coolant housing cover 31 are fitted with one another with the fitting gap T in a state in which the elastic ring 37 is compressed. As a result, the depressed portions (凹) 35-2 and the protruding portions (凸) 35-1 may be fitted with one another.

Finally, when the cover cap 33 is rotated, the depressed portions (凹) 35-2 and the protruding portions (凸) 35-1 are fitted with each other, such that the depressed portions (凹) 35-2 and the protruding portions (凸) 35-1 engage with one another. The engagement is applied to the entire section of the cover cap rim at which the depressed portions (凹) 35-2 are formed and the entire section of the cap end 31c at which the protruding portions (凸) 35-1 are formed. As a result, the cover cap 33 is fixed to the coolant housing cover 31.

As described above, the fixing members 35 combine the coolant housing cover 31 and the cover cap 33 with the engagement structure, and as a result, it is possible to overcome all disadvantages of a screw thread fastening structure in the related art that additionally requires a process of forming threads after a shaping process.

Figure 6:
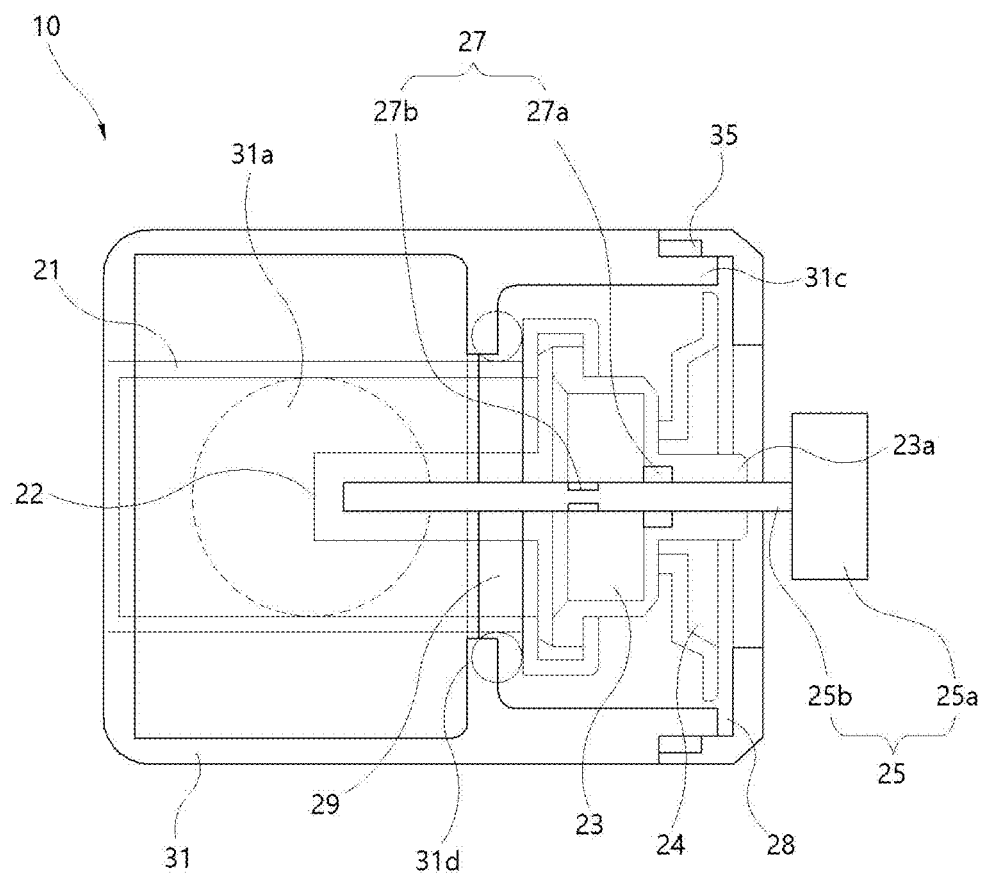
FIG. 6 is a cross-sectional view of the assembled magnetic valve actuator according to the present disclosure.

Referring to FIG. 6, the valve actuator 10 is integrally assembled as the wax valve unit 20 is inserted into the valve cover unit 30.

As illustrated, the wax valve unit 20 is integrated by assembling the wax valve housing 21, the wax casing 22, the guide 23, the valve cap 24, the push rod 25, and the magnetic elements 27, and the valve cover unit 30 is integrated by assembling the coolant housing cover 31, the cover cap 33, the fixing members 35, and the elastic ring 37.

Therefore, the valve actuator 10 is assembled such that the piston 27a of the push rod 25 is exposed to the outside of the wax valve housing 21 through the center hole of the cover cap 33 in the state in which the wax valve unit 20 is embedded in the internal space of the valve cover unit 30.

For example, the positions at which the respective constituent components are arranged in the assembled state of the valve actuator 10 are described below.

The wax valve housing 21 is positioned in the left internal space defined by the valve support inner wall 31d in the internal space of the coolant housing cover 31, such that the wax valve housing 21 faces the coolant inlet port 31a and the coolant outlet port 31b. In the state in which the wax casing 22 is coupled to the coolant housing cover 31, the wax casing body filled with the wax 22-1 is positioned in the left internal space of the coolant housing cover 31.

Therefore, since the wax valve housing 21 and the wax casing 22 are positioned in the left internal space of the coolant housing cover 31, the wax 22-1 may be expanded or contracted depending on a temperature of the coolant that fills the left internal space of the coolant housing cover 31.

The guide 23 is coupled to the wax casing 22, and the valve cap 24 is coupled to the guide 23, such that the guide 23 and the valve cap 24 are positioned in the right internal space defined by the valve support inner wall 31d in the internal space of the coolant housing cover 31.

Therefore, the guide 23 and the valve cap 24 may be positioned in the right internal space of the coolant housing cover 31 and thus blocked from the coolant.

The rod bar 25b of the push rod 25 is inserted into the valve cap 24, the guide 23, and the wax casing 22, and the stepped portion 25c of the rod bar 25b is positioned at a coupling portion between the wax casing 22 and the guide 23, such that a rear section of the stepped portion 25c comes out of the cover cap 33 via the valve cap 24, whereas a front section of the stepped portion 25c enters the guide 23 so as to come into contact with the wax 22-1.

Therefore, in the assembled state of the push rod 25, the rod bar attachment magnet 27a of the magnetic elements 27 forms a magnet spacing distance together with the guide attachment magnets 27b provided on the inner diameter portion of the guide boss 23a of the guide 23. The magnet spacing distance is hardly influenced or less influenced by the repulsive force between the rod bar attachment magnet 27a and the guide attachment magnets 27b so as not to block the wax expansion force of the wax 22-1.

As described above, the rod bar attachment magnet 27a and the guide attachment magnets 27b are spaced apart from one another by the magnet spacing distance. Further, the intensity of the magnetic force (i.e., the repulsive force) may be changed in accordance with a decrease in magnet spacing distance as the position of the push rod 25 is moved by the wax expansion force of the wax 22-1.

The valve actuator 10 in the assembled state is sealed by the packing 28 and the O-ring 29.

For example, the packing 28 seals the right internal space of the coolant housing cover 31 by being fitted with the outer diameter portion of the circular plate body of the valve cap 24 and being in close contact with the lateral side of the cap end 31c of the coolant housing cover 31. In contrast, the O-ring 29 seals the left internal space and the right internal space of the coolant housing cover 31 by being positioned on the stepped portion of the wax valve housing 21 and being in contact with the valve support inner wall 31d of the coolant housing cover 31.

Therefore, the valve actuator 10 is characterized by being the magnetic valve actuator 10. The magnetic valve actuator 10 may use a balance between the wax expansion force of the wax 22-1 and the magnetic forces of the magnetic elements 27 in the state in which the magnetic valve actuator 10 is mounted by the mounting bracket 8 fastened to the housing of the heat exchanger 6, thereby reducing a side effect and generating the restoring force without a spring. As a result, the valve actuator 10 is basically different from the mechanical wax actuator valve in the related art.

Figure 8:
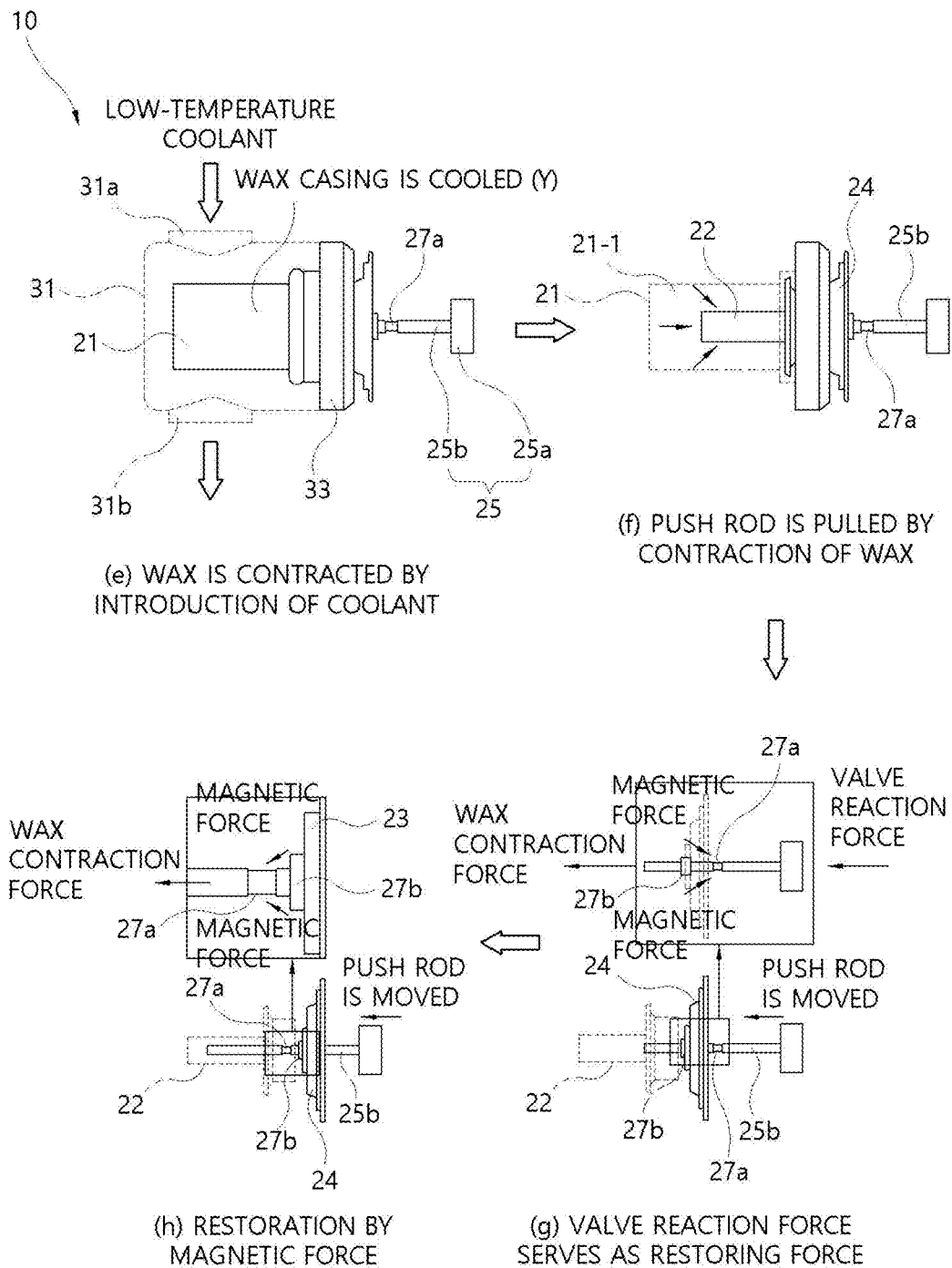
FIG. 8 is a view illustrating an operating state in which the magnetic valve actuator is thermally contracted by a low-temperature coolant which is not heated by the exhaust heat recovery system according to the present disclosure.

Meanwhile, FIGS. 7 and 8 illustrate states in which the valve actuator 10 applied to the exhaust heat recovery system 5 (see FIG. 1) operates.

Referring to a reaction of the high-temperature coolant in FIG. 7, the thermal expansion of the valve actuator 10 is performed as the high-temperature coolant, which is introduced into the coolant inlet port 31a and is to be discharged from the coolant outlet port 31b, is received in the left internal space of the coolant housing cover 31.

First, the wax valve housing 21 and the wax casing 22 are heated by heat exchange with the high-temperature coolant received in the left internal space of the coolant housing cover 31, such that the wax casing is heated (X), which defines a state a in which the wax is expanded by the introduction of the coolant.

Next, the wax 22-1 is expanded in the sealed internal space of the wax casing 22 by the heat exchange with the high-temperature coolant, such that the wax expansion force is applied to the rod bar 25b of the push rod 25, which defines a state b in which the push rod is pushed out by the expansion of the wax.

Then, the push rod 25 is pushed out by the wax expansion force and begins to form a forward movement stroke, and the forward movement stroke is converted into a forward movement of the push rod 25 that comes into contact with the exhaust gas flow control unit 7 (see FIG. 1).

Next, the rod bar attachment magnet 27a of the magnetic elements 27 is pushed out together with the push rod 25 and approaches the guide attachment magnets 27b provided on the inner diameter portion of the guide boss 23a of the guide 23, the repulsive force between the rod bar attachment magnet 27a and the guide attachment magnets 27b is increased as the interval between the rod bar attachment magnet 27a and the guide attachment magnets 27b is decreased. This defines a state c in which the magnetic force and the wax force are applied in opposite directions.

Then, the repulsive force acts as resistive force against the wax expansion force, thereby preventing the push rod 25 from being rapidly moved forward by the wax expansion force. This configuration may be configured only by the repulsive force without mechanical components related to the reduction in side effect, such that it is possible to eliminate the relevant components. In particular, it is possible to remove a drawback of the mechanical wax actuator in which rattling noise such as "rumbling" occurs when the vehicle travels at the moment when the contact is implemented due to a rapid change in movement amount of the push rod with respect to a change in temperature of the engine coolant.

Finally, as the wax expansion force is increased, the push rod 25 further moves forward while overcoming the repulsive force, such that the rod bar attachment magnet 27a deviates from the guide attachment magnets 27b and moves to a position behind the guide attachment magnets 27b, which defines a state d in which the magnetic force and the wax force are applied in the same direction.

Then, the repulsive force is converted into the magnetic repulsive force and acts as an auxiliary force with respect to the wax expansion force to further move the push rod 25 forward, such that the rod bar 25b of the push rod 25 further comes out of the wax casing 22. As a result, the piston 25a comes into contact with the exhaust gas flow control unit 7 (see FIG. 1), and the piston 25a pushes out the exhaust gas flow control unit 7 with a pressing force made by the wax expansion force and the magnetic repulsive force, such that the operation of the exhaust gas flow control unit 7 is performed.

Figure 9:
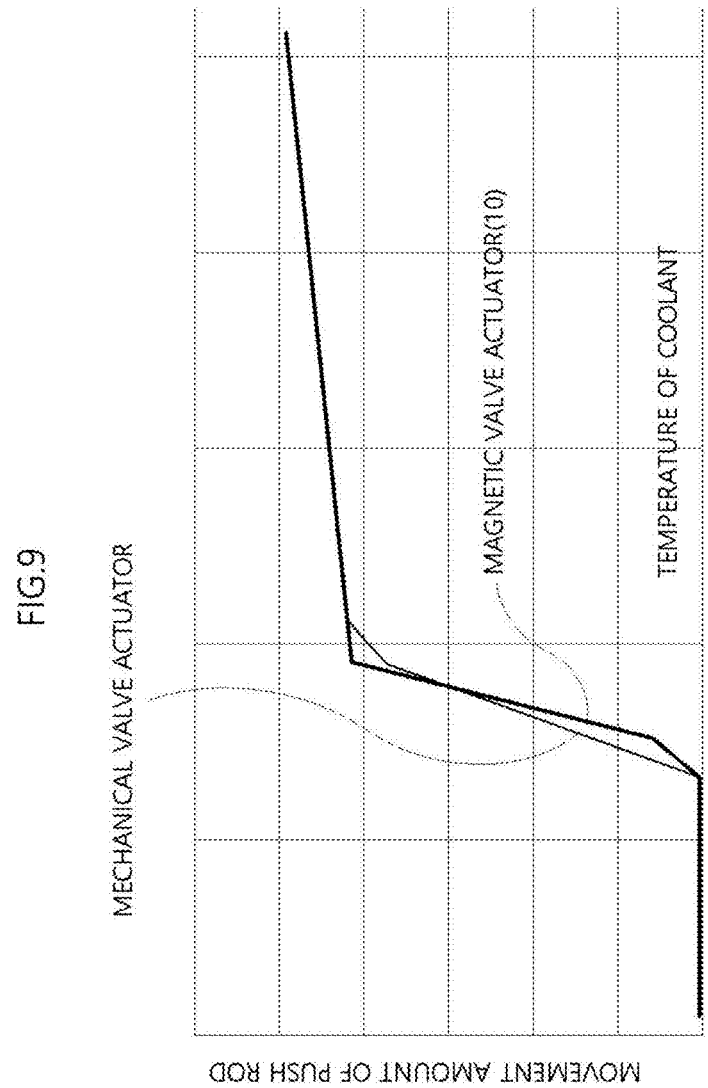
FIG. 9 is a view illustrating a performance result of the magnetic valve actuator based on a stroke diagram of a push rod according to the present disclosure.

In contrast, referring to a reaction of the low-temperature coolant in FIG. 9, the thermal contraction of the valve actuator 10 is performed as the low-temperature coolant, which is introduced into the coolant inlet port 31a and is to be discharged from the coolant outlet port 31b, is received in the left internal space of the coolant housing cover 31.

First, the wax valve housing 21 and the wax casing 22 are cooled by heat exchange with the low-temperature coolant received in the left internal space of the coolant housing cover 31, such that the wax casing is cooled (Y), which defines a state e in which the wax is contracted by the introduction of the coolant.

Next, the wax 22-1 is contracted in the sealed internal space of the wax casing 22 by the heat exchange with the low-temperature coolant, such that the wax contraction force is applied to the rod bar 25b of the push rod 25, which defines a state f in which the push rod is pulled by the contraction of the wax.

Then, the push rod 25 is pulled by the wax contraction force and begins to form a return movement stroke, and the return movement stroke is converted into a rearward movement of the push rod 25 that moves away from the exhaust gas flow control unit 7 (see FIG. 1).

Next, the push rod 25 continues to move rearward by receiving the valve reaction force in accordance with the return of the exhaust gas flow control unit 7 (see FIG. 1) to an initial position, instead of the wax expansion force. The rod bar attachment magnet 27a of the magnetic elements 27 moves rearward together with the push rod 25 and approaches the guide attachment magnets 27b provided on the inner diameter portion of the of the guide boss 23a of the guide 23. The repulsive force between the rod bar attachment magnet 27a and the guide attachment magnets 27b is increased as the interval between the rod bar attachment magnet 27a and the guide attachment magnets 27b is decreased, which defines a state g in which the valve reaction force serves as the restoring force.

Then, the repulsive force is applied as a resistive force against the valve reaction force, thereby preventing the push rod 25 from being rapidly moved rearward by the valve reaction force and reducing the side effect that occurs when the push rod 25 moves forward.

Finally, as the valve reaction force is increased, the push rod 25 further moves rearward while overcoming the repulsive force, such that the rod bar attachment magnet 27a deviates from the guide attachment magnets 27b and moves to a position in front of the guide attachment magnets 27b, which defines a state h in which the restoration is implemented by the magnetic force.

Then, the repulsive force is converted into the magnetic repulsive force and applied as an auxiliary force with respect to the valve reaction force, thereby further moving the push rod 25 rearward. As a result, the rod bar 25b of the push rod 25 is inserted deep into the wax casing 22, and the operation of the exhaust gas flow control unit 7 (see FIG. 1) is stopped.

Meanwhile, FIG. 9 is a view illustrating a performance result of the magnetic valve actuator based on a stroke diagram of a push rod according to the present disclosure.

As illustrated in the diagram of the movement amount of the push rod with respect to the temperature of the coolant, it has been proved experimentally that the valve actuator 10 uses the characteristics of the magnetic valve actuator to remove the moment when the valve actuator 10 is just in contact with the valve, in comparison with the general mechanical valve actuator, by using the balance between the wax expansion force and the magnetic force even though the movement amount of the push rod is rapidly changed depending on the temperature of the coolant.

As described above, the exhaust heat recovery system 5 applied to the engine system 1 according to the present embodiment includes the magnetic valve actuator 10 that uses the resistive force against the magnetic forces of the magnetic elements 27 to reduce the forward movement speed of the push rod 25 made by the wax expansion force of the wax 22-1 that exchanges heat with the coolant passing through the internal space or to reduce the restoring movement speed of the push rod 25 made by the wax contraction force of the wax 22-1, or uses an additional force to increase the forward movement speed of the push rod 25 or the restoring movement speed of the push rod 25. Therefore, the operation of operating the valve of the exhaust gas flow control unit 7 is performed without using elastic force of a spring. In particular, the magnetic force adjusts the movement speed of the push rod made by the wax expansion force. As a result, it is possible to implement miniaturization with the structure simplified by eliminating components related to a reduction in side effect and simplify manufacturing and assembling processes by reducing the number of components.

What is claimed is:

1. A valve actuator comprising:
    a valve cover unit having an internal space filled with a coolant; and
    a wax valve unit configured to form a forward movement stroke in which a push rod comes out of the valve cover unit and a restoring movement stroke in which the push rod enters the valve cover unit, generate a wax expansion force for the forward movement stroke and a wax contraction force for the restoring movement stroke by allowing wax to exchange heat with the coolant in the internal space, and generate, on a movement route of the push rod through magnetic elements, magnetic forces from a resistive force and an additional force against the wax expansion force and the wax contraction force.

2. The valve actuator of claim 1, wherein the magnetic force uses the resistive force to decrease a movement speed of the push rod made by the wax expansion force or the wax contraction force or uses the additional force to increase the movement speed of the push rod.

3. The valve actuator of claim 1, wherein the wax valve unit comprises:
- a wax valve housing positioned in a left internal space of the internal space which is filled with the coolant;
- a wax casing filled with the wax and coupled to the wax valve housing;
- a guide coupled to the wax casing and positioned in a right internal space of the internal space which is not filled with the coolant;
- a valve cap coupled to the guide;
- a rod bar attachment magnet provided on the push rod and configured to constitute one of the magnetic elements; and
- a guide attachment magnet provided on the guide and configured to constitute another of the magnetic elements, generate the resistive force in a state in which the guide attachment magnet approaches the rod bar attachment magnet, and generate the additional force in a state in which the guide attachment magnet is spaced apart from the rod bar attachment magnet.

4. The valve actuator of claim 3, wherein the wax valve housing, the wax casing, the guide, the valve cap, and the push rod are arranged in a straight line.

5. The valve actuator of claim 3, wherein the push rod comprises:
- a rod bar having one end positioned in the wax casing and the other end which comes out of the valve cap in a state in which one end of the rod bar is in contact with the wax; and
- a piston formed integrally with the other end of the rod bar.

6. The valve actuator of claim 5, wherein the rod bar has a stepped portion to which the rod bar attachment magnet is coupled.

7. The valve actuator of claim 6, wherein the rod bar has the stepped portion formed at a position at which the rod bar attachment magnet is spaced apart from the guide attachment magnet in the state in which one end of the rod bar is in contact with the wax.

8. The valve actuator of claim 3, wherein the guide has a guide boss protruding from a center of a guide body and penetrating the valve cap, and the guide attachment magnet is provided on the guide boss.

9. The valve actuator of claim 8, wherein the guide attachment magnet is positioned on an inner diameter portion of the guide boss.

10. The valve actuator of claim 3, wherein the wax valve unit comprises sealing members configured to seal the left internal space and the right internal space.

11. The valve actuator of claim 10, wherein the sealing members are configured as a packing and an O-ring, the packing is coupled to the valve cap to seal the right internal space, and the O-ring is coupled to the wax valve housing to seal the left internal space.

12. The valve actuator of claim 1, wherein the valve cover unit comprises:
- a coolant housing cover having the internal space having an inlet portion into which the wax valve unit is inserted, and having a coolant inlet port through which the coolant is introduced, and a coolant outlet port through which the coolant is discharged;
- a cover cap coupled to the inlet portion of the coolant housing cover and configured to seal the internal space; and
- an elastic ring positioned inside the cover cap and configured to seal the coolant housing cover and the cover cap.

13. The valve actuator of claim 12, wherein the coolant housing cover has a valve support inner wall formed in the internal space and configured to support the wax valve unit, and the valve support inner wall divides the internal space into a left internal space which is filled with the coolant and a right internal space which is not filled with the coolant.

14. The valve actuator of claim 12, wherein the coolant housing cover and the cover cap are coupled by means of fixing members, and the fixing members couple the coolant housing cover and the cover cap through engagement implemented by an engagement structure having protruding and depressed portions.

15. The valve actuator of claim 14, wherein the engagement structure comprises:
- the protruding portions formed on the coolant housing cover; and
- the depressed portions formed in the cover cap.

16. The valve actuator of claim 15, wherein the protruding portions and the depressed portions engage with one another as the cover cap rotates in a state in which positions of the protruding portions and the depressed portions coincide with one another.

17. An exhaust heat recovery system comprising:
- a valve actuator configured to use a resistive force against magnetic forces of magnetic elements to decrease a forward movement speed of a push rod made by a wax expansion force of wax that exchanges heat with a coolant passing through an internal space or to decrease a restoring movement speed of the push rod made by a wax contraction force of the wax, or use an additional force of the magnetic forces to increase the forward movement speed of the push rod or the restoring movement speed of the push rod;
- a heat exchanger configured to exchange heat between the coolant and exhaust gas; and
- an exhaust gas flow control unit provided in an exhaust pipe in which the exhaust gas flows and configured to apply a valve reaction force to a restoring movement stroke after a valve is operated by a forward movement stroke of the push rod.

18. The exhaust heat recovery system of claim 17, wherein the magnetic elements comprise:
- a rod bar attachment magnet configured to move together with the push rod; and
- a guide attachment magnet fixed into the valve actuator, wherein the magnetic force is generated as the resistive force while the rod bar attachment magnet approaches the guide attachment magnet in a movement route of the push rod, and
- wherein the magnetic force is generated as the additional force while the rod bar attachment magnet moves away from the guide attachment magnet.

19. The exhaust heat recovery system of claim 17, wherein the valve actuator is mounted on the exhaust gas flow control unit by means of a mounting bracket.

20. The exhaust heat recovery system of claim 17, wherein the valve actuator introduces the coolant into a coolant supply pipe connected to a cooling system of an engine system and discharges the coolant into a coolant return pipe to return the coolant back to the cooling system.

* * * * *